US008502409B2

(12) United States Patent
Kato et al.

(10) Patent No.: US 8,502,409 B2
(45) Date of Patent: Aug. 6, 2013

(54) POWER SUPPLY CONTROL APPARATUS

(75) Inventors: Norihiko Kato, Kariya (JP); Takehiro Kubotani, Kariya (JP); Yukikazu Koide, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 435 days.

(21) Appl. No.: 12/954,213

(22) Filed: Nov. 24, 2010

(65) Prior Publication Data

US 2011/0128662 A1 Jun. 2, 2011

(30) Foreign Application Priority Data

Nov. 27, 2009 (JP) ................. 2009-270168

(51) Int. Cl.
*B60L 1/00* (2006.01)
(52) U.S. Cl.
USPC .......................................... 307/9.1; 307/10.6
(58) Field of Classification Search
USPC .................................................. 307/9.1, 10.6
See application file for complete search history.

(56) References Cited

U.S. PATENT DOCUMENTS

| 7,404,459 | B2 | 7/2008 | Nakanishi |
| 7,586,727 | B2 | 9/2009 | Yamashita |
| 2003/0000759 | A1 | 1/2003 | Schmitz et al. |
| 2008/0150369 | A1 | 6/2008 | Suzuki et al. |
| 2008/0174926 | A1 | 7/2008 | Evans et al. |

FOREIGN PATENT DOCUMENTS

| JP | 09-233836 A | 9/1997 |
| JP | 2004-088821 A | 3/2004 |
| JP | 2005-312156 A | 11/2005 |
| JP | 2008-022675 A | 1/2008 |
| JP | 2009-044914 A | 2/2009 |

OTHER PUBLICATIONS

European Search Report dated May 25, 2011 issued in corresponding European Patent Application No. 10 192 336.5.

*Primary Examiner* — Robert L. Deberadinis
(74) *Attorney, Agent, or Firm* — Sughrue Mion, PLLC

(57) ABSTRACT

A power supply control apparatus for controlling a power supply unit including a battery and a load is provided. The power supply control apparatus includes a main relay and a ground relay, a pre-charge relay, an inrush current limiting resistor, a first relay control section, and a time measurement section. The main relay and the ground relay are connected between the battery and the load. The pre-charge relay is connected in parallel with one of the main relay and the ground relay. The inrush current limiting resistor is connected in series with the pre-charge relay, and limits an inrush current from the battery to the load. The first relay control section temporarily turns ON the pre-charge relay and turns ON the main relay and the ground relay upon receiving a power supply connection request from the outside, and turns OFF the main relay and the ground relay upon receiving a power supply interruption request from the outside. The time measurement section chooses a time point in the period from when the pre-charge relay is turned ON to when it is turned OFF, and measures the elapsed time from the chosen time point. Before the elapsed time measured by the time measurement section reaches a predetermined reference period, the first relay control section does not turn OFF the main relay and the ground relay, but maintains the relays ON, even when receiving the power supply interruption request.

5 Claims, 4 Drawing Sheets (12)

POWER SUPPLY CONTROL APPARATUS

BACKGROUND OF THE INVENTION

The present invention relates to a power supply control apparatus for controlling a power supply unit mounted on a vehicle.

Japanese Laid-Open Patent Publication No. 2004-88821 discloses a power supply control apparatus that keeps track of the number of times a motor serving as a vehicle drive source is connected to a high voltage battery for supplying power to the motor. When the count value reaches a predetermined value, the power supply control apparatus inhibits the connection between the high voltage battery and the motor providing time for an inrush current limiting resistor to radiate heat, thereby protecting the resistor.

However, according to the above prior art, the high voltage battery and the motor cannot be connected each other during the period from when the connection between the high voltage battery and the motor is inhibited to when the inrush current limiting resistor has sufficiently radiated heat. This creates a time period in which the vehicle cannot be driven.

SUMMARY OF THE INVENTION

Accordingly, it is an objective of the present invention to provide a power supply control apparatus that is capable of starting a vehicle when necessary, while reliably permitting an inrush current limiting resistor to sufficiently radiate heat.

To achieve the foregoing objective and in accordance with one aspect of the present invention, a power supply control apparatus for controlling a power supply unit including a battery and a load is provided. The power supply control apparatus includes a main relay and a ground relay, a pre-charge relay, an inrush current limiting resistor, a first relay control section, and a time measurement section. The main relay and the ground relay are connected between the battery and the load. The pre-charge relay is connected in parallel with one of the main relay and the ground relay. The inrush current limiting resistor is connected in series with the pre-charge relay, and limits an inrush current from the battery to the load. The first relay control section temporarily turns ON the pre-charge relay and turns ON the main relay and the ground relay upon receiving a power supply connection request from the outside, and turns OFF the main relay and the ground relay upon receiving a power supply interruption request from the outside. The time measurement section chooses a time point in the period from when the pre-charge relay is turned ON to when it is turned OFF, and measures the elapsed time from the chosen time point. Before the elapsed time measured by the time measurement section reaches a predetermined reference period, the first relay control section does not turn OFF the main relay and the ground relay, but maintains the relays ON, even when receiving the power supply interruption request.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A power supply control apparatus according to a preferred embodiment of the present invention will now be described with reference to the drawings.

Figure 1:
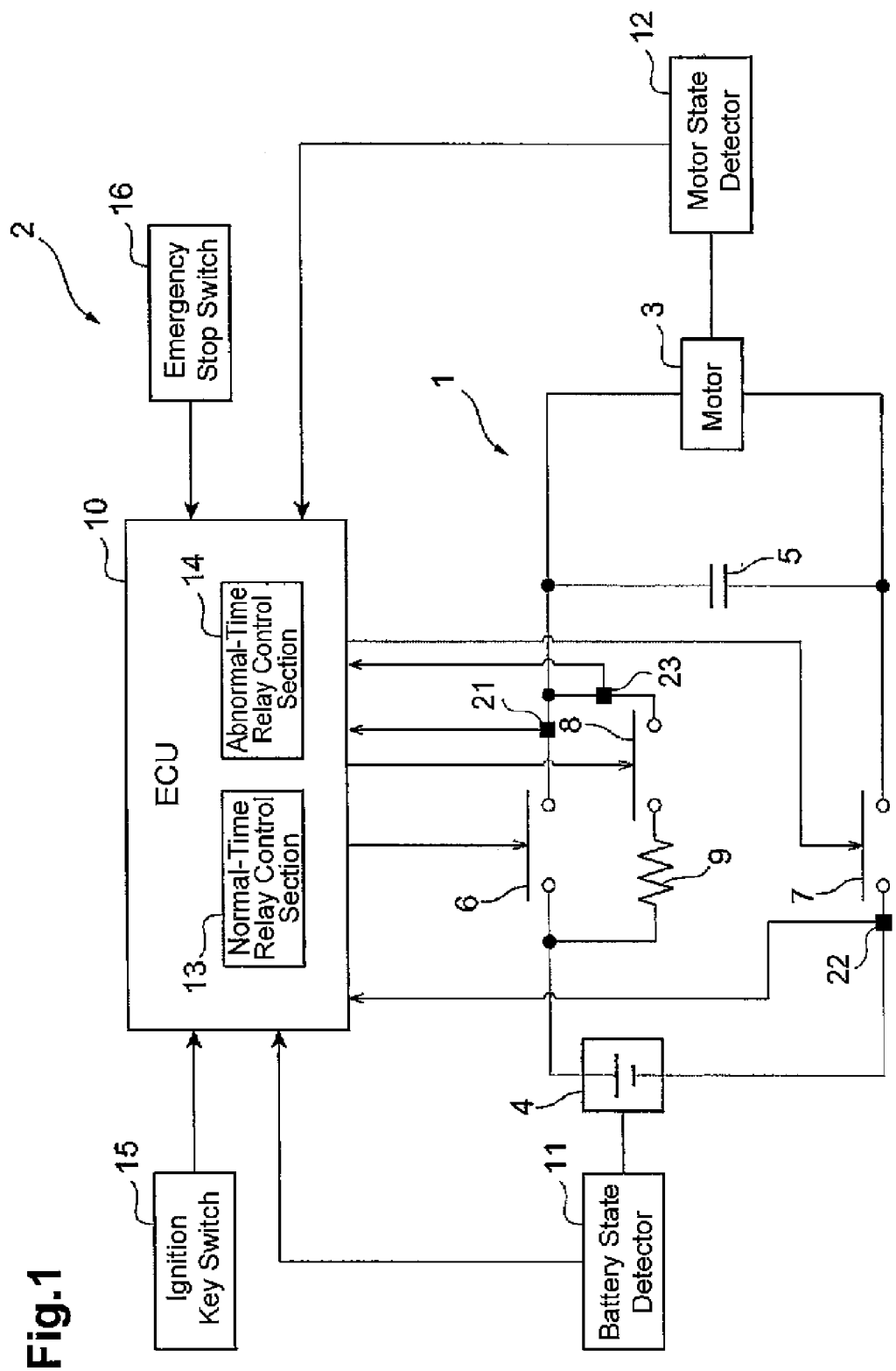
FIG. 1 is a block diagram illustrating a power supply control apparatus according to one embodiment of the present invention, together with the electric circuit of a power supply unit.

With reference to FIG. 1, a power supply unit 1 and a power supply control apparatus 2 are mounted on a forklift, which is a type of industrial vehicle.

The power supply unit 1 includes a motor 3 and a high voltage battery 4 for supplying power to the motor 3. The motor 3 is a drive motor that rotates wheels of the forklift. The high voltage battery 4 is a large capacity battery of, for example, DC 200V. A capacitor 5 for filtering the current through the motor 3 is connected in parallel with the motor 3.

A main relay 6 is connected between the positive terminal (+) of the high voltage battery 4 and the motor 3, and a ground relay 7 is connected between the negative terminal (−) of the high voltage battery 4 and the motor 3. A pre-charge relay 8 is connected in parallel with the main relay 6.

An inrush current limiting resistor 9 is connected in series with the pre-charge relay 8. The inrush current limiting resistor 9 limits an inrush current from the high voltage battery 4 to the motor 3. In a state where the high voltage battery 4 is electrically connected to the motor 3, an instantaneous large current that flows from the high voltage battery 4 to the motor 3 at the start of power supply, or an inrush current, can destroy the main relay 6. The inrush current limiting resistor 9 converts the energy of the inrush current into thermal energy, thereby preventing the main relay 6 from being damaged.

The power supply control apparatus 2 includes an electronic control unit (ECU) 10, a battery state detector 11, and a motor state detector 12. The battery state detector 11 detects the state of the high voltage battery 4 (for example, the voltage, current, and temperature) and sends detection signals to the ECU 10. The motor state detector 12 detects the state of the motor 3 (for example, the voltage, current, and temperature) and sends detection signals to the ECU 10. The power supply control apparatus 2 further includes a main relay state detector 21, a ground relay state detector 22, and a pre-charge relay state detector 23. These relay state detectors 21, 22, 23 are, for example, voltmeters that detect the state of the corresponding relay 6, 7, 8 (for example, the voltage) and send a detection signal to the ECU 10.

The ECU 10 is connected to an ignition key switch 15 for starting the forklift and an emergency stop switch 16 for bringing the operation of the forklift to an emergency stop.

The ECU 10 includes a normal-time relay control section 13 and an abnormal-time relay control section 14. The normal-time relay control section 13 executes predetermined procedures based on a command signal (ON/OFF signal) from the ignition key switch 15, so as to control the relays 6 to 8. The abnormal-time relay control section 14 executes predetermined procedures based on a command signal (ON/OFF signal) from the emergency stop switch 16 and detection signals from the state detectors 11, 12, and 21 to 23, so as to control the relays 6 to 8.

Figure 2:
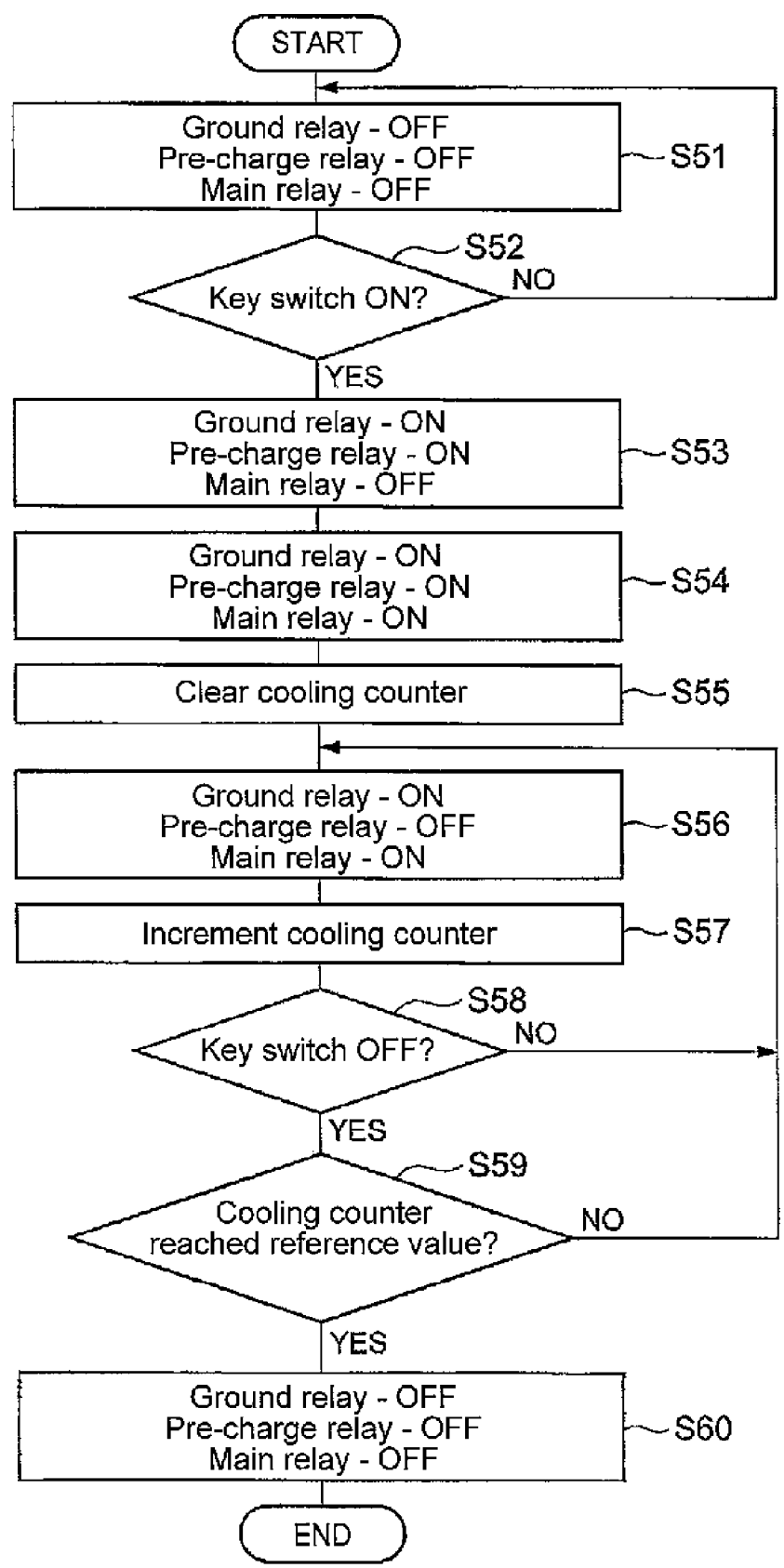
FIG. 2 is a flowchart showing a relay control process executed by a normal-time relay control section of the power supply control apparatus shown in FIG. 1.

FIG. 2 is a flowchart showing a relay control process executed by the normal-time relay control section 13. In the initial state, the normal-time relay control section 13 turns OFF (interrupts) all of the main relay 6, the ground relay 7, and the pre-charge relay 8 (step S51).

The normal-time relay control section 13 determines whether the ECU 10 has received a start-up command signal (ON signal) from the ignition key switch 15 (step S52). If the ECU 10 has received a start-up command signal, the normal-time relay control section 13 turns ON (conducts) the ground relay 7 and the pre-charge relay 8 (step S53). When a predetermined period has elapsed, the normal-time relay control section 13 turns the main relay 6 ON (step S54) and clears a cooling count value to zero (step S55).

The normal-time relay control section 13 turns OFF the pre-charge relay 8 (step S56) and increments the value of the cooling counter (step S57).

The normal-time relay control section 13 determines whether the ECU 10 has received a stop command signal (OFF signal) from the ignition key switch 15 (step S58). If the ECU 10 has not received a stop command signal, the normal-time relay control section 13 repeatedly executes steps S56, S57.

When the ECU 10 has received a stop command signal, the normal-time relay control section 13 determines whether a reference period (for example, 100 seconds) has elapsed since the main relay 6 was turned ON, that is, whether the value of the cooling counter has reached a predetermined reference value (for example, a value corresponding to 100 seconds) (step S59). When the cooling counter has not reached the reference value, the normal-time relay control section 13 repeatedly executes steps S56 to S58. When the cooling counter has reached the reference value, the normal-time relay control section 13 turns OFF the main relay 6 and the ground relay 7 (step S60).

Figure 3:
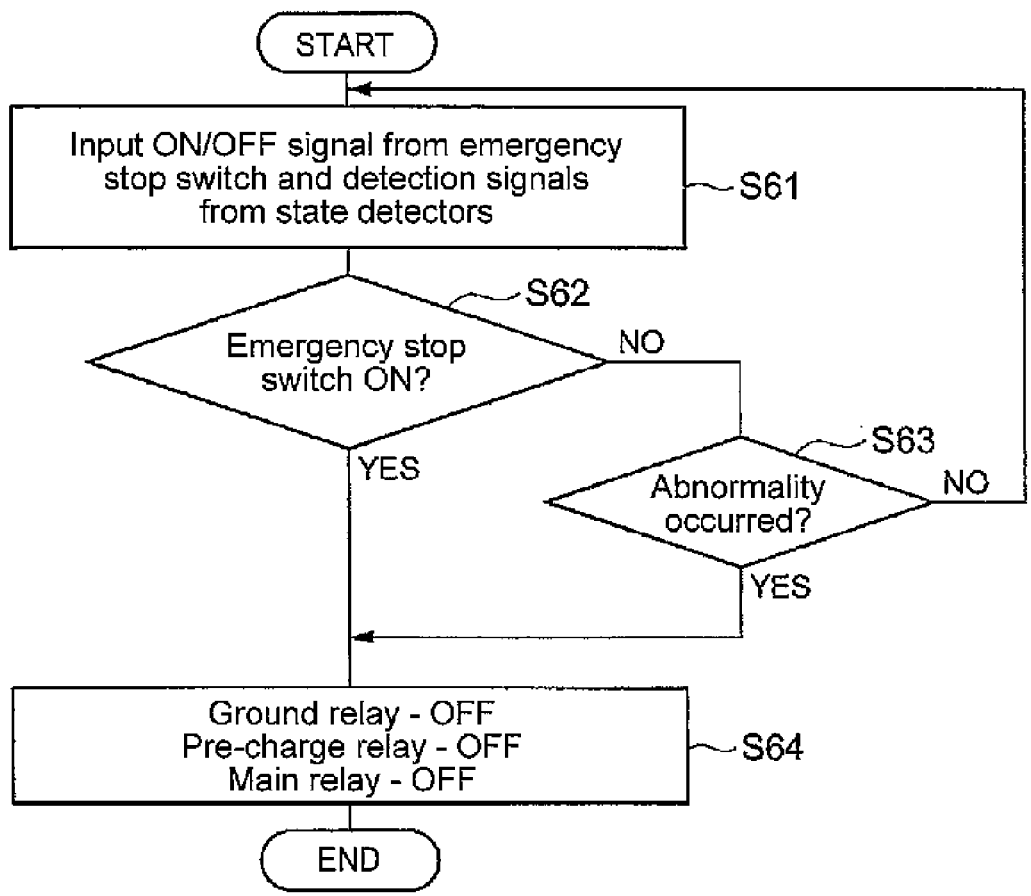
FIG. 3 is a flowchart showing a relay control process executed by an abnormal-time relay control section of the power supply control apparatus shown in FIG. 1.

FIG. 3 is a flowchart showing a relay control process executed by the abnormal-time relay control section 14. The ECU 10 receives an ON/OFF signal from the emergency stop switch 16 and detection signals from the state detector 11, 12, 21 to 23 (step S61). The abnormal-time relay control section 14 determines whether the emergency stop switch 16 is ON (step S62). When the emergency stop switch 16 is ON, the abnormal-time relay control section 14 turns OFF the main relay 6, the ground relay 7, and the pre-charge relay 8 (step S64).

When the emergency stop switch 16 is OFF, the abnormal-time relay control section 14 determines whether there is an abnormality in any of the high voltage battery 4, the motor 3, the main relay 6, the ground relay 7, and the pre-charge relay 8 based on the detection signals from the state detectors 11, 12, 21 to 23 (step S63). Specifically, the abnormal-time relay control section 14 determines whether any parameters such as the voltage, current, and temperature of the high voltage battery 4 and the motor 3 is abnormal, and determines whether a parameter such as the voltage of any of the relays 6, 7, and 8 is abnormal. When there is no abnormality in any of the high voltage battery 4, the motor 3, and the relays 6, 7, 8, the process returns to step S61. In contrast, when there is an abnormality in at least one of the high voltage battery 4, the motor 3, and the relays 6, 7, 8, the abnormal-time relay control section 14 turns OFF the main relay 6, the ground relay 7, and the pre-charge relay 8 (step S64).

Steps S51 to S54, S56, and S58 to S60 correspond to a process executed by a first relay control section. That is, when receiving a start command signal, which is a power supply connection request, from the outside, the normal-time relay control section 13 serving as a first relay control section temporarily turns ON the pre-charge relay 8 and turns ON the main relay 6 and the ground relay 7. When receiving a stop command signal corresponding to a power supply interruption request from the outside, the normal-time relay control section 13 turns OFF the main relay 6 and the ground relay 7. Steps S55 and S57 correspond to a process executed by a time measurement section. That is, the normal-time relay control section 13 serving as a time measurement section chooses a time point in the period from when the pre-charge relay 8 is turned ON to when it is turned OFF, and measures the elapsed time from the chosen time point. Before the elapsed time measured by the time measurement section reaches the predetermined reference period, the normal-time relay control section 13 serving as a first relay control section does not turn OFF the main relay 6 and the ground relay 7, but maintains the relays 6, 7 ON, even if it receives a power supply interruption request.

The state detectors 11, 12, and 21 to 23, and the ECU (particularly, the abnormal-time relay control section 14) function as an abnormality detecting section that detects an abnormality in a battery (the high voltage battery 4), a load (the motor 3), the main relay 6, the ground relay 7, and the pre-charge relay 8. When detecting an abnormality in at least one of the battery 4, the load 3, the main relay 6, the ground relay 7, and the pre-charge relay 8 based on detection signals from the state detectors 11, 12, and 21 to 23, the abnormal-time relay control section 14 functions as a second relay control section that forcibly turns OFF the main relay 6 and the ground relay 7.

Figure 4:
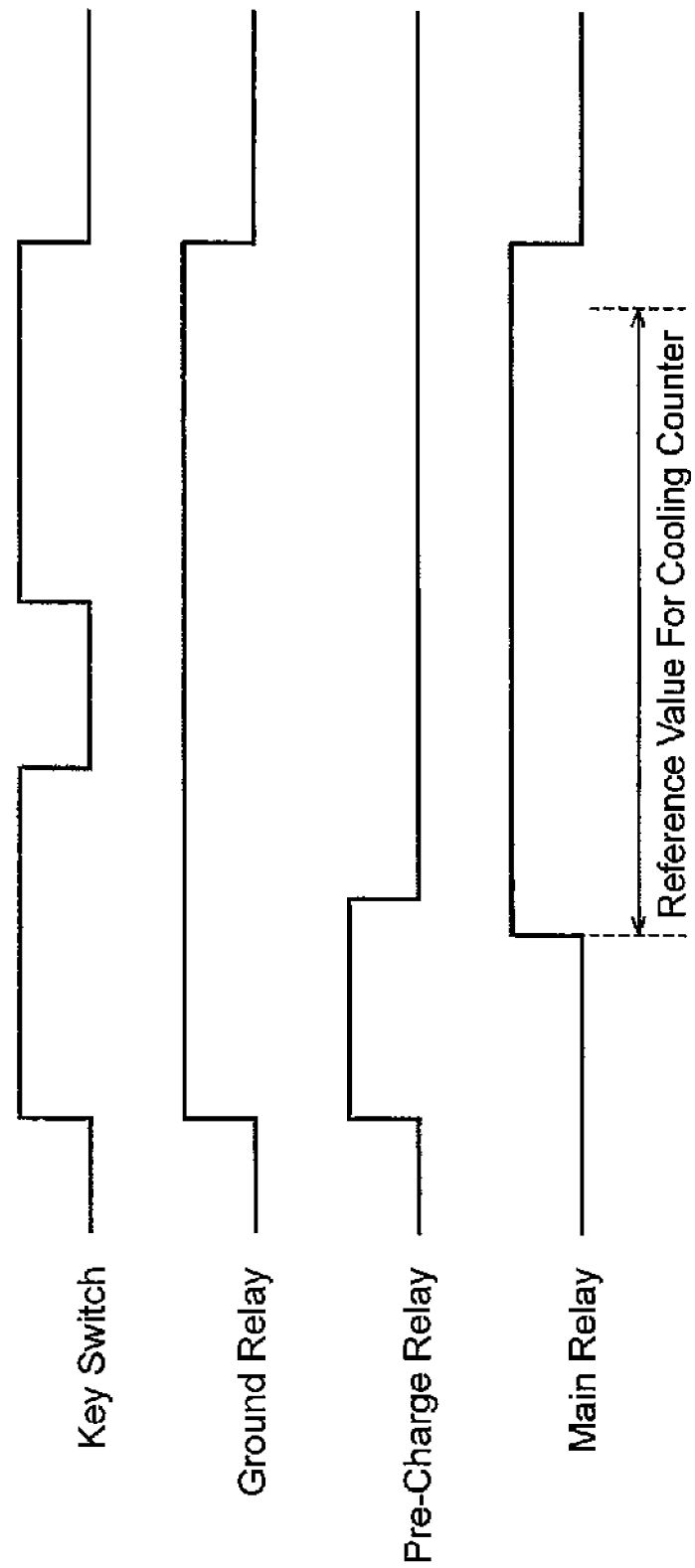
FIG. 4 is a timing chart showing operation of the power supply control apparatus shown in FIG. 1.

Operation of the present embodiment, which is configured as described above, will now be described with reference to FIG. 4. When the ignition key 15 is turned ON to start the forklift, the normal-time relay control section 13 turns ON the ground relay 7 and the pre-charge relay 8. Then, the high voltage battery 4 and the motor 3 are electrically connected to each other via the inrush current limiting resistor 9 and the pre-charge relay 8, and a current flows from the high voltage battery 4 to the inrush current limiting resistor 9. This suppresses the inrush current from the high voltage battery 4 to the motor 3. At this time, because of the current flowing therethrough, the inrush current limiting resistor 9 generates heat. Therefore, if electrical connection and interruption between the high voltage battery 4 and the motor 3 are repeated, the inrush current limiting resistor 9 does not sufficiently radiate heat and becomes overheated.

When the predetermined period elapses and the input voltage to the motor 3 is raised, the normal-time relay control section 13 turns the main relay 6 ON and clears the value of the cooling counter to zero. Thereafter, the normal-time relay control section 13 turns OFF the pre-charge relay 8. This electrically connects the high voltage battery 4 and the motor 3 to each other via the main relay 6, so that current is supplied from the high voltage battery 4 to the motor 3 via the main relay 6. The normal-time relay control section 13 starts incrementing the cooling counter at the same time as turning ON the main relay 6 (ON time point). When the main relay 6 is turned ON, the inrush current limiting resistor 9 stops receiving the current and starts radiating heat (cooling).

Thereafter, if the cooling count value has not reached the predetermined value when the ignition key switch 15 is turned OFF, the normal-time relay control section 13 determines that the inrush current limiting resistor 9 has not been sufficiently cooled and maintains the main relay 6 and the ground relay 70N, instead of turning these OFF. However, the drive system including the motor 3 is completely stopped, and the forklift is not operated.

Thereafter, when the ignition key switch 15 is turned ON again, the main relay 6 and the ground relay 7 are ON, and the pre-charge relay 8 is OFF. Since no current flows through the inrush current limiting resistor 9, the inrush current limiting resistor 9 does not generate heat, but continues radiating heat. The inrush current limiting resistor 9 can sufficiently radiate heat. Also, since the high voltage battery 4 and the motor 3 are electrically connected to each other, the forklift is restarted immediately.

Thereafter, if the cooling count value has reached the predetermined value when the ignition key switch 15 is turned OFF, the normal-time relay control section 13 determines that the inrush current limiting resistor 9 has been sufficiently cooled and turns OFF the main relay 6 and the ground relay 7. This interrupts the electrical connection between the high voltage battery 4 and the motor 3.

When the emergency stop switch 16 is turned ON by the driver, or when a failure occurs in any of the high voltage battery 4, the motor 3, the main relay 6, the ground relay 7, and the pre-charge relay 8, the abnormal-time relay control section 14 forcibly turns OFF the main relay 6 and the ground relay 7 regardless of the heat radiation state of the inrush current limiting resistor 9, that is, regardless of whether or not the inrush current limiting resistor 9 has been sufficiently cooled. This allows a failure in the battery 4, the load 3, and the relays 6 to 8 to be quickly dealt with, and thus prevents further problems of the power supply unit 1 from occurring.

According to the present embodiment as described above, when the ignition key switch 15 is turned OFF, the normal-time relay control section 13 allows the main relay 6 and the ground relay 7 to be interrupted if the predetermined period has elapsed from the time at which the main relay 6 is turned ON. In contrast, the normal-time relay control section 13 does not allow the main relay 6 and the ground relay 7 to be interrupted if the predetermined period has not elapsed from the time at which the main relay 6 is turned ON. This allows the inrush current limiting resistor 9 to effectively radiate heat (cool). Therefore, even if the ignition key switch 15 is repeatedly turned ON and OFF, that is, even if the forklift is repeatedly started and stopped, the inrush current limiting resistor 9 is sufficiently cooled, and the high voltage battery 4 and the motor 3 can be electrically connected to each other. Therefore, when the forklift is repeatedly started and stopped, a problem in which the forklift cannot be started for a certain period of time is avoided.

A typical industrial vehicle such as a forklift repeatedly transports cargos for a short distance or for a short time, or a number of operators frequently take over the forklift in turn. Such an industrial vehicle is repeatedly started and stopped. Therefore, it is particularly effective to use the power supply control apparatus 2 according to the present invention in a power supply unit 1 mounted in an industrial vehicle.

According to the present invention, it is possible to start a vehicle when necessary, while reliably causing the inrush current limiting resistor 9 to radiate heat. Thus, even if the vehicle is repeatedly started and stopped, the inrush current limiting resistor 9 is protected.

When a failure occurs in any of the battery 4, the load 3, and the relays 6 to 8, the main relay 6 and the ground relay 7 are immediately interrupted. Abnormal operation of the power supply unit 1 therefore can be effectively dealt with.

The above described control of the main relay 6 and the ground relay 7 can be realized by changing only software, without adding new components. Costs are therefore not increased.

The present invention is not limited to the above described embodiment. For example, in the above embodiment, the cooling counter starts being incremented at the same time as the main relay 6 is turned ON. Instead, the cooling counter may start being incremented at any other time, for example, at the time when the pre-charge relay 8 is turned OFF or ON.

In the above embodiment, the pre-charge relay 8 and the inrush current limiting resistor 9 are connected in parallel with the main relay 6. However, the pre-charge relay 8 and the inrush current limiting resistor 9 may be connected in parallel with the ground relay 7. In this case, when the ignition key switch 15 is turned ON, the main relay 6 and the pre-charge relay 8 are turned ON. Then, after a predetermined period has elapsed, the ground relay 7 is turned ON.

In the above embodiment, when the ignition key switch 15 is turned ON again after being turned OFF, the pre-charge relay 8 is not turned ON, but maintained OFF if the cooling count value has not reached the predetermined value. However, the pre-charge relay 8 may be turned ON.

Even in this case, since the main relay 6 and the ground relay 7 are maintained ON, current flows through the main relay 6 and the ground relay 7, which have no resistance. Thus, since no current flows through the inrush current limiting resistor 9, the inrush current limiting resistor 9 continues radiating heat.

In the above embodiment, the power supply unit 1 and the power supply control apparatus 2 are mounted on a forklift. However, the present invention may be applied to any other vehicle such as an automobile.

What is claimed is:

1. A power supply control apparatus for controlling a power supply unit including a battery and a load, the apparatus comprising:
    a main relay and a ground relay connected between the battery and the load;
    a pre-charge relay connected in parallel with one of the main relay and the ground relay;
    an inrush current limiting resistor connected in series with the pre-charge relay, the inrush current limiting resistor limiting an inrush current from the battery to the load;
    a first relay control section that temporarily turns ON the pre-charge relay and turns ON the main relay and the ground relay upon receiving a power supply connection request from the outside, and turns OFF the main relay and the ground relay upon receiving a power supply interruption request from the outside; and
    a time measurement section that chooses a time point in the period from when the pre-charge relay is turned ON to when it is turned OFF, and measures the elapsed time from the chosen time point,
    wherein, before the elapsed time measured by the time measurement section reaches a predetermined reference period, the first relay control section does not turn OFF the main relay and the ground relay, but maintains the relays ON, even when receiving the power supply interruption request.

2. The power supply control apparatus according to claim 1, further comprising:
    an abnormality detecting section that detects an abnormality in any of the battery, the load, the main relay, the ground relay, and the pre-charge relay; and
    a second relay control section that turns OFF the main relay and the ground relay when the abnormality detecting section detects an abnormality of at least one of the battery, the load, the main relay, the ground relay, and the pre-charge relay.

3. The power supply control apparatus according to claim 1, wherein the first relay control section turns OFF the main relay and the ground relay when the first relay control section receives the power supply interruption request and the elapsed time has reached the reference period.

4. The power supply control apparatus according to claim 1, wherein one of the main relay and the ground relay is a first relay, and the other is a second relay, the pre-charge relay being connected in parallel with the first relay, when receiving the power supply connection request, the first relay control section turning ON the pre-charge relay and the second relay so as to allow a current to flow to the inrush current limiting resistor, thereafter turning ON the first relay so as to allow a current to flow between the battery and the load via the first and second relays, and then turning OFF the pre-charge relay.

5. The power supply control apparatus according to claim 1, wherein the power supply unit is mounted on an industrial vehicle.

\* \* \* \* \*